(12) United States Patent
Wise

(10) Patent No.: US 9,990,476 B2
(45) Date of Patent: *Jun. 5, 2018

(54) SYSTEM FOR INTERACTIVE MATRIX MANIPULATION CONTROL OF STREAMED DATA AND MEDIA

(71) Applicant: TailStream Technologies, LLC, Chicago, IL (US)

(72) Inventor: Kelley Wise, Villa Park, CA (US)

(73) Assignee: TailStream Technologies, LLC, Orange, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/633,300

(22) Filed: Jun. 26, 2017

(65) Prior Publication Data

US 2017/0357779 A1 Dec. 14, 2017

Related U.S. Application Data

(63) Continuation of application No. 15/137,027, filed on Apr. 25, 2016, now Pat. No. 9,690,912, which is a (Continued)

(51) Int. Cl.
*G06F 21/10* (2013.01)
*G06F 9/455* (2018.01)
(Continued)

(52) U.S. Cl.
CPC .......... *G06F 21/10* (2013.01); *G06F 9/45558* (2013.01); *G06F 21/53* (2013.01); *G06F 21/62* (2013.01); *H04L 63/0428* (2013.01); *H04L 63/08* (2013.01); *H04L 63/102* (2013.01); *H04L 65/601* (2013.01); *H04N 1/32702* (2013.01); *H04N 1/32793* (2013.01); (Continued)

(58) Field of Classification Search
CPC ..... G06F 21/62; G06F 21/10; H04N 1/32702; H04N 1/32793
See application file for complete search history.

(56) References Cited

U.S. PATENT DOCUMENTS

| 4,682,869 A | 7/1987 | Itoh ......................... 358/426.12 |
| 4,870,497 A | 9/1989 | Chamzas ..................... 382/240 |

(Continued)

*Primary Examiner* — Thaddeus Plecha
(74) *Attorney, Agent, or Firm* — Niron McAndrews, LLC

(57) ABSTRACT

An interactive streaming media and application service provider system can securely stream high resolution, multiple formats of video and data. Different data sets can be included in a single stream. A rights management system controls matrix manipulation and other aspects of user control of the data, including one or more of rendering in various different 2D, 3D, or other media formats, reconstruction and modeling, zooming, frame grab, print frame, parental controls, picture in picture, preventing unauthorized copying, adapting to different data transmission formats, adapting to different resolutions and screen sizes, and actively control functionality contained in embedded data, encryption/decryption. Control can be exerted by an external entity through a user-side virtual machine. Control codes can optionally be embedded in the media, embedded in the user's device, and/or sent separately to the device.

18 Claims, 7 Drawing Sheets

Related U.S. Application Data continuation of application No. 13/776,511, filed on Feb. 25, 2013, now Pat. No. 9,325,682, which is a continuation-in-part of application No. 12/104,314, filed on Apr. 16, 2008, now abandoned.

(60) Provisional application No. 61/609,164, filed on Mar. 9, 2012, provisional application No. 60/912,105, filed on Apr. 16, 2007.

(51) Int. Cl.

| | | |
|---|---|---|
| *G06F 21/53* | (2013.01) | |
| *G06F 21/62* | (2013.01) | |
| *H04L 29/06* | (2006.01) | |
| *H04N 1/327* | (2006.01) | |
| *H04N 21/2389* | (2011.01) | |
| *H04N 21/254* | (2011.01) | |
| *H04N 21/4402* | (2011.01) | |
| *H04N 21/443* | (2011.01) | |
| *H04N 21/6543* | (2011.01) | |

(52) U.S. Cl.
CPC ... *H04N 21/23892* (2013.01); *H04N 21/2541* (2013.01); *H04N 21/4402* (2013.01); *H04N 21/443* (2013.01); *H04N 21/6543* (2013.01); *G06F 2009/45595* (2013.01); *G06F 2221/034* (2013.01); *G06F 2221/0713* (2013.01); *H04L 2463/101* (2013.01)

(56) References Cited

U.S. PATENT DOCUMENTS

| | | | |
|---|---|---|---|
| 4,979,049 A | 12/1990 | Chamzas | 358/426.11 |
| 4,999,715 A | 3/1991 | Porcellio | 358/426.01 |
| 5,189,526 A | 2/1993 | Sasson | 382/246 |
| 5,204,756 A | 4/1993 | Chevion | 382/239 |
| 5,432,871 A | 7/1995 | Novik | 382/232 |
| 6,199,081 B1 | 3/2001 | Meyerzon | 715/210 |
| 6,557,102 B1 | 4/2003 | Wong | 713/176 |
| 6,760,483 B1 | 7/2004 | Elichai | 382/241 |
| 6,799,195 B1 * | 9/2004 | Thibault | G05B 19/41835 700/4 |
| 6,850,564 B1 * | 2/2005 | Pejhan | H04N 7/14 348/404.1 |
| 6,904,185 B1 | 6/2005 | Wilkins | 382/311 |
| 6,934,698 B2 | 8/2005 | Judd | |
| 6,938,211 B1 | 8/2005 | Chang | 715/733 |
| 6,952,477 B1 | 10/2005 | Lotspiech | 380/37 |
| 7,079,649 B1 | 7/2006 | Bramhill | 713/156 |
| 7,181,617 B2 | 2/2007 | Wise | 713/164 |
| 7,685,417 B2 | 3/2010 | Wise | 713/164 |
| 8,195,937 B2 | 6/2012 | Wise | 713/164 |
| 8,631,506 B2 | 1/2014 | Wise | 726/29 |
| 8,677,119 B2 | 3/2014 | Wise | 713/164 |
| 9,325,682 B2 * | 4/2016 | Wise | H04N 1/32702 |
| 9,690,912 B2 * | 6/2017 | Wise | G06F 21/10 |
| 2001/0000265 A1 | 4/2001 | Schreiber | 726/30 |
| 2001/0034673 A1 | 10/2001 | Yang | 705/28 |
| 2002/0103682 A1 | 8/2002 | Stemmer | 705/7.12 |
| 2002/0108050 A1 | 8/2002 | Raley | 713/193 |
| 2002/0120611 A1 | 8/2002 | Kernz | |
| 2002/0184325 A1 | 12/2002 | Killcommons | 709/206 |
| 2002/0198821 A1 | 12/2002 | Munoz | 705/38 |
| 2003/0004754 A1 | 1/2003 | Krutz | 705/2 |
| 2003/0014406 A1 | 1/2003 | Faieta | |
| 2003/0074358 A1 | 4/2003 | Sarbaz | |
| 2004/0111292 A1 | 6/2004 | Hutchins | 705/2 |
| 2005/0014560 A1 | 1/2005 | Blumenthal | 463/36 |
| 2005/0076015 A1 | 4/2005 | Dettinger | |
| 2005/0097001 A1 | 5/2005 | Iijima | 705/26.1 |
| 2005/0262111 A1 | 11/2005 | Li | |
| 2006/0080278 A1 | 4/2006 | Neiditsch | |
| 2006/0101102 A1 | 5/2006 | Su | |
| 2006/0242210 A1 | 10/2006 | Ring | |
| 2006/0253305 A1 | 11/2006 | Dougherty | 705/4 |
| 2007/0073589 A1 | 3/2007 | Vergeyle | 705/14.19 |
| 2008/0144711 A1 * | 6/2008 | Chui | H04N 19/159 375/240.01 |
| 2008/0255878 A1 | 10/2008 | Wise | 705/2 |
| 2008/0263048 A1 | 10/2008 | Wise | |
| 2008/0275790 A1 | 11/2008 | Campbell | 705/26.3 |
| 2009/0112802 A1 | 4/2009 | Srinivasan | |
| 2009/0210451 A1 | 8/2009 | Woodroffe | |
| 2009/0228300 A1 | 9/2009 | Hamel | 705/2 |
| 2009/0254542 A1 | 10/2009 | Kang | |
| 2009/0271373 A1 | 10/2009 | Mandel | |

* cited by examiner

SYSTEM FOR INTERACTIVE MATRIX MANIPULATION CONTROL OF STREAMED DATA AND MEDIA

CLAIM FOR PRIORITY

This application is a continuation of U.S. patent application Ser. No. 15/137,027 titled "System for Interactive Matrix Manipulation Control of Streamed Data and Media" filed Apr. 25, 2016, a continuation of U.S. patent application Ser. No. 13/776,511 titled "System for Interactive Matrix Manipulation Control of Streamed Data and Media" filed Feb. 25, 2013 that is a continuation-in-part of U.S. patent application Ser. No. 12/104,314 titled "Filed Access Management System" that was filed on Apr. 16, 2008 by Kelley Wise and claims the benefit of U.S. Provisional Application 60/912,105 that was filed on Apr. 16, 2007, this application also claims the benefit of U.S. Provisional Application 61/609,164 that was filed on Mar. 9, 2012, the contents of which are all herein incorporated by reference.

BACKGROUND

The field of the invention is data and media streaming.

This system in one embodiment is manifested as one or more streaming media servers, running our proprietary image, video, audio, matrix manipulation controlled encoding and streaming software, a network, and subscribers/remote users that download a proprietary remote viewer to their computer, television, tablet or smart phone device.

This system provides controllable streamed data and interactive entertainment media such as video in an encoded or encrypted form over the Internet to an applet or a virtual machine operating in a buffer in the remote users computer or wireless device either in conjunction with the operating system of the remote computer or device or independent of the operating system and under the control of the external streaming server which provides a separate Boolean control code or other type of control code to match with the authorized remote user's control code provided by the service provider. The provider of the streamed media or data is able to turn on and off a set of premium services by remote control such as 3D images and different levels of resolution on the screen to name a few by streaming a separate control code to remotely control the matrix manipulation control system inside the virtual machine. (The control code sent from the streaming media provider server shakes hands with the remote viewer to confirm it is an authorized viewer and not a video copying software system.)

The viewer maintains an active control connection to the streaming server through the control code from the server connecting to the remote viewer.

The control code could also be internal to the device and or pre-installed to communicate with the embedded data in the streamed code to engage matrix manipulation as required for the control specifications contain in the streamed data.

While it is useful for streaming media providers to provide the remote user manual control over the streamed images, videos, or files, using matrix manipulation inside a virtual machine, the present methodologies to not address a host of problems that occur on the Internet regarding content piracy and other issues and features and functionality not being provided in prior art methods. My novel and inventive method provides a much higher lever of control over the streamed data and media content than any prior art method.

In my novel method the application or media service provider use a separate set of streamed control codes to give the provide active control and active encryption over the streamed data by having a server stream a separate Boolean control code or other type of code to a matrix manipulation control system operating inside the remote computer either in a virtual machine operating inside a buffer or sandbox or browser or embedded in a chip or other device to control or manipulate the image or data inside the device or virtual machine with matrix manipulation and or transformation to provide different levels of service, when an authorized user has entered a corresponding control code into the matrix manipulation control system functioning inside the chip, device or a virtual machine, running inside the remote user's computer or wireless Internet device.

When large numbers of remote users on different remote receiving devices with different data requirements need different levels of video resolution the system can provide each user the correct resolution through the matrix manipulation control system to add or subtract horizontal video lines of a video file or large image file, such as a medical diagnostic image, when a full resolution image is not needed as with a low resolution image used as a thumbnail such as when opening a file or a low resolution image being restored to a full resolution image by the users input when allowed, or when the service provider remotely switches on more resolution on demand or converting a 2D image or video to a particular type of 3D display such as anaglyph or bi-polarized in different transmission formats such as Frame sequential, Frame packing, Side-by-side, and Checkerboard 3D image or video data transmission techniques.

These current methods of streamed 3D transmission formats are data bandwidth intensive and requires considerable processing power, our novel method will control the frame switching functions inside a matrix manipulation control system operating in a virtual machine or device to separate the process from the operating system if desired to maintain secure content control and allow for greater control and manipulation capabilities of the streamed image, audio, or video data.

A few of the different services that can be offered using our novel method are 3D viewing on demand, different levels of high resolution on demand, and secure encryption services which can allow different levels of active encryption to be added as well as the ability to constantly change the encryption algorithms using the method of streamed control codes to a matrix manipulation control system. This and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

Unless the context dictates the contrary, all ranges set forth herein should be interpreted as being inclusive of their endpoints and open-ended ranges should be interpreted to include only commercially practical values. Similarly, all lists of values should be considered as inclusive of intermediate values unless the context indicates the contrary.

Thus, there is still a need for systems and methods that can be used to securely stream media to an end user.

BRIEF SUMMARY

An application service provider server streams encrypted and or encoded data with a Boolean operating code or other type of code over the Internet. The application service provider server also streams a separate Boolean control code or other type of control code corresponding to the streamed data with Boolean operating code or other type of operating code to control a matrix manipulation control system functioning inside a remote device or a virtual machine operating inside the buffer of a remote user's device, computer or wireless Internet device in order to provide access authorization and unlock features on demand when the remote user enters another Boolean control code provided by the application service provider. A separate control code is provided to device manufacturers and distributers to install in remote user devices to control codes from the streamed media or data provider to cause the remote device to adapt the matrix manipulation control system or other system internal to the remote user's device to accept different formats of streamed image, audio, and video data and other streamed data.

The encrypted and or encoded data and Boolean operating code is streamed through a matrix manipulation control system running inside an applet or virtual machine operating inside a buffer such as a sandbox or browser in a remote user's computer or other device. The streamed Boolean control code controls the matrix manipulation functions of the Matrix manipulation control system functioning inside the virtual machine to control access to the streamed data and lock and control viewer functionality, image resolution, 3D viewing, and other features. Authorized users receive the distributed control code and enter the control code into the matrix manipulation control system functioning inside the virtual machine viewer. The control code unlocks the matrix manipulation encryption system. The remote controlled matrix manipulation encryption system opens according to the level of access authorized and provides access to the authorized matrix manipulation controlled features available from the streamed data code. The virtual machine viewer displays the streamed data. Streamed 3D data is switched, sequenced, modified and/or transformed as layers of frames, side by side frames, and/or a checkerboard matrix of pixels for each video frame by mathematically switching on and off as desired, each data set and every part of each data set individually to achieve any type of 3D display needed at any resolution desired by the remote user or required for the remote user's device in order to be properly displayed or monitored.

Besides the objectives and advantages of the preferred embodiment of the inventive subject matter described above, there are objectives and advantages also some of which are:

a) To use this method to further prevent unauthorized copying of the data, images, video, or file.

b) To use this method to provide parental controls over access to content.

c) To use this method to render image data d) Render an image in 3D e) Allow a device to remotely adapt to different 3D transmission formats.

f) To allow a remote device to automatically adjust to different image resolutions streamed from a provider.

g) To remotely control by matrix manipulation, access to available controls on the remote Viewer.

h) To remotely set functionality levels in the remote user's device by remote control of the matrix manipulation control system.

i) To remotely control access to streamed left and right eye images and video content for 3D display on demand.

j) To remotely control conversion of left and right eye images and video content to display anaglyph 3D display.

k) To remotely control the type of 3D display that can be viewed remotely, such as selecting anaglyph or Bi-Polar 3D viewing.

l) To remotely engage controls on the remote user's device which allow the remote user to select the type of 3D display.

m) To remotely modify streamed data to convert into another format inside the virtual machine using matrix manipulation.

n) To remotely disable or allow playback of the streamed content by controlling matrix manipulation of the data inside the virtual machine.

o) To actively control functionality contained in an active digital water mark embedded in the data to control interactive media.

p) The method conserve processor power in the remote device when decoding streamed stacked image data sets and compressed side by side set of data for streamed 3D displays.

These objects described above and many others are achieved in the preferred embodiment of the inventive subject matter and allow for further advantages to become apparent from a consideration of the ensuing description and drawings.

BRIEF DESCRIPTION OF THE DRAWINGS

These and other features and advantages of the various embodiments disclosed herein will be better understood with respect to the following description and drawings, in which like numbers refer to like parts throughout, and in which:

The drawings shown are flow charts representing two of the preferred embodiments of the inventive subject matter and show the steps to use a matrix manipulation control system inside a remote receiving computer or wireless device or other device which acts like matching puzzle sets and or a filter or matrix of doors or windows opening and closing to actively control access and functionality of streamed data, images, interactive video and other streamed applications. The matrix manipulation control system is controlled and locked remotely by a streamed Boolean control code from the application service provider and engaged by a corresponding control code inputted from the authorized remote user and can be further used to activate controls contained in an active digital water mark embedded in the code.

Figure 1:
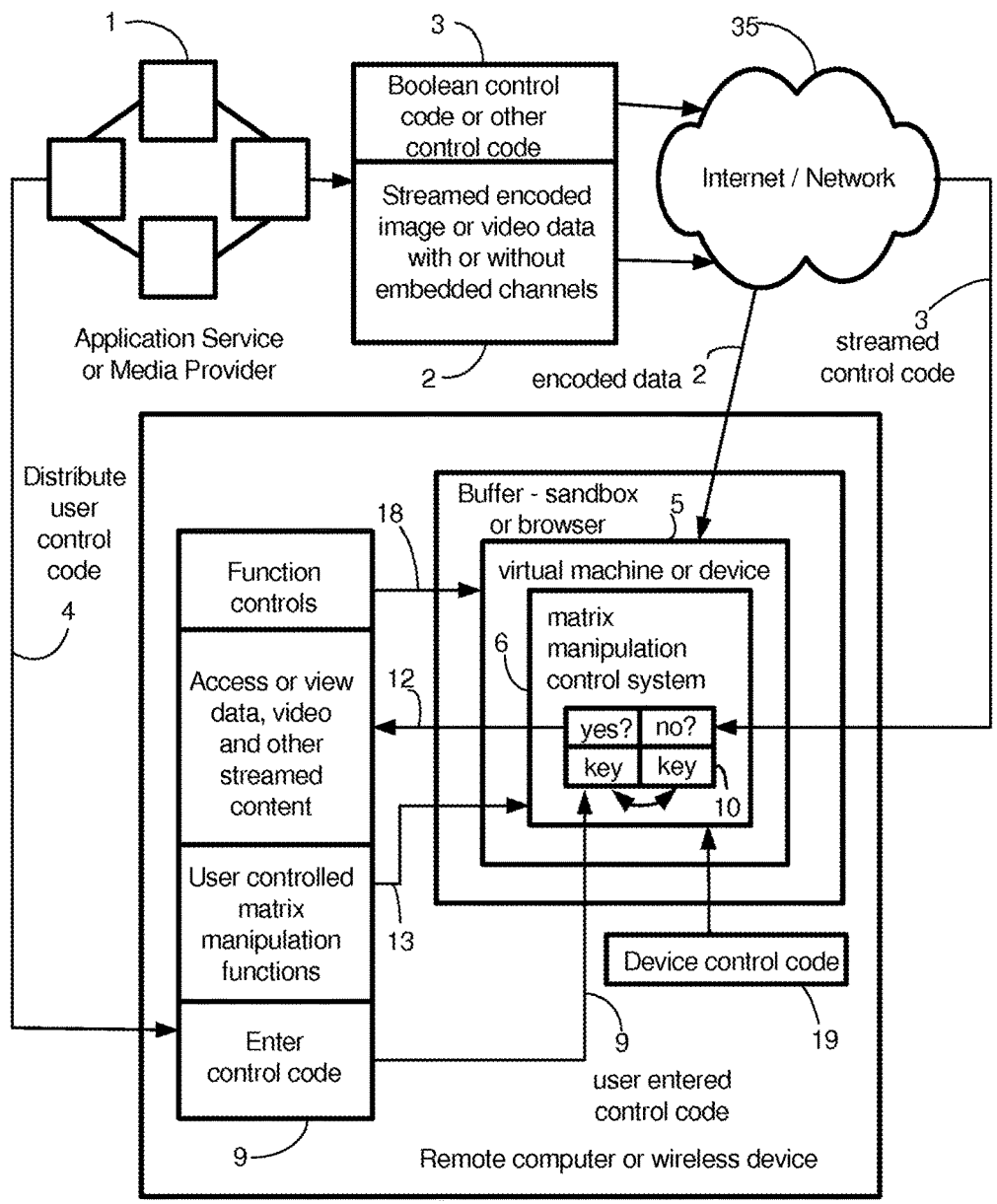

The drawings shown are two flowcharts, which are FIG. 1, FIG. 2, and FIG. 3, FIG. 4, FIG. 5, FIG. 6, and FIG. 7, representing the present invention and showing the steps controlling and manipulating the data stream with an active matrix manipulation control system.

1. Application Service or Media Provider Servers

2. Application service provider server streams or encodes a file or data for streaming with encrypted and or encoded data as a single data set or more than one data set combined together and encoded with a matrix manipulation filter or encryption puzzle pattern or other similar data modifications encoded onto the data and with or without an embedded digital water mark embedded in the data over a network or the Internet with a corresponding Boolean operating code or other code streamed separately.

3. Application service provider server streams or encodes for streaming, a separate Boolean control code for the streamed data with Boolean operating code which can be assigned to each user.

4. A separate control code can be provided to the user for the user to input to a device to enable functionality or additional functionality or products and services on a device or service.

5. An applet or virtual machine or other device operating inside a buffer such as a sandbox or browser in a remote user's computer or a matrix manipulation control system embedded in another device receives the encrypted or encoded data or data sets with the matrix manipulation encryption and interactive function control code encoded onto the data or data sets.

6. A matrix manipulation control system interacts with the streamed Boolean control code or other streamed control code which controls the matrix manipulation control system functions running inside a virtual machine or other device to control matrix manipulation of the streamed data, to add or remove functionality or control access to the streamed data, and lock and control the remote device functionality, image resolution, Stereo 3D viewing, and other features and control embedded digital watermark type control functions that have been embedded in the data itself such as image data, video, and other types of streamed data.

7. A user control code is received by the user.

8. Authorized user receives the distributed user control code.

9. User inputs the user control code into the matrix control system.

10. The user control code unlocks or activates matrix manipulation encryption or controls of the system or the digital watermark functions embedded in the data.

11. Functionality or controls are engaged by user input of a control code

12. Access control system inside the matrix manipulation control system opens or controls encoded user control functionality.

13. The matrix manipulation control system engages functions according to the level of access authorized and provides access to streamed content and the authorized matrix manipulation controlled features available from the streamed or downloaded data code.

14. The Matrix Manipulation filter decodes the data according to the control code by adjusting the encoded matrix manipulation settings of each component of the encoded streamed data sets.

15. Active digital watermark or matrix manipulation control encoded data or data sets 16. Virtual machine or other device displays or provides the streamed data.

17. The streamed operating Boolean code or other control code allows the user to have manual control over standard functions of the embedded device or viewer or other type of device that receive and transmits streamed data.

18. When authorized a remote user may control some matrix manipulation functions of the virtual machine viewer.

19. A device can utilize its own control code for authorization or other purpose.

20. For 3D media encoding the system inputs one, two, or more channels of a video or image or other data or data sets.

21. A programmable matrix manipulation control filter encoder encodes different matrix manipulation control settings onto various desired components of the data or data sets which can be assigned to operate with the proper control code to turn on and off or to switch, adjust, filter, enlarge, offset, dim, change color, or other form of manipulation which can be performed using matrix manipulation to adjust the pixels or other data to be displayed or provided for user interaction.

22. The system allows left and right channels of video and or stereoscopic images and data or other type of 3D media or data to be controlled and switched at a high rate of speed using matrix manipulation switching and or manipulation.

23. The System can be used for encryption by and access authorization by assigning different types of control codes as per the needs of the ASP.

24. Stereo, 3D or multi-channel data is combined or encoded as multi-layer data to react as desired to the corresponding control codes required using matrix manipulation to act as matching puzzle pieces or activating the desired data or sub sets of data.

25. The encoded data is streamed or encoded as a file for streaming.

26. The encoded data can be streamed together or streamed separately.

27. The data or data sets is streamed or input to the remote users matrix manipulation control system or matrix manipulation filter in the remote users device.

28. A second streamed data set is input to the matrix manipulation control system or filter.

29. A user control code is input by the user or by the users device or automatically by the ASP if needed into the matrix manipulation control system or filter.

30. The system/s uses the control codes to manipulate and or permit access and manipulation of the encoded data or data sets and enables features such as 3D and interactive controls of the media or data 31. The combined data sets are decoded to produce 3D video, images, data, and or interactive media, displays, data, or combinations of different data and media functionality.

32. Encoded stereoscopic or multi-channel 3D video, images or data in a matrix manipulation adjusted matrixed and layered data set format with or without a digital watermark in a combined encoded form that allows for active and or interactive decoding in real time with matrix manipulation controls and or manipulates the various encoded components of each portion of the data set/s.

34. The data sets are encoded to be decoded or switched by matrix manipulation of each encoded component of the data or data sets.

35. The Internet or a network.

36. Data such as user data or interactive control codes from the user to the ASP can engage interactive functionality and other features of the system such as allowing the remote user access to other data streams and e-commerce applications from the ASP.

37. The system provides a graphical user interface for the user to manipulate, interact the data.

38. The system uses a server or other computer device to modify, adjust, manipulate and combine data sets such as one or more channels of video or other data to encode the data and stream the data or save the encoded as a file for streaming. This device or server will produce and stream corresponding control codes for the encoded data and perform other services for the ASP as described herein.

FIG. 1 represents an embodiment of the inventive subject matter showing the steps of providing an encoded stream of data and a separate control code to control functions and access of the data and using an authorized users control code input into the system to actively communicate with the control code streamed from the application or media service provider.

Figure 2:
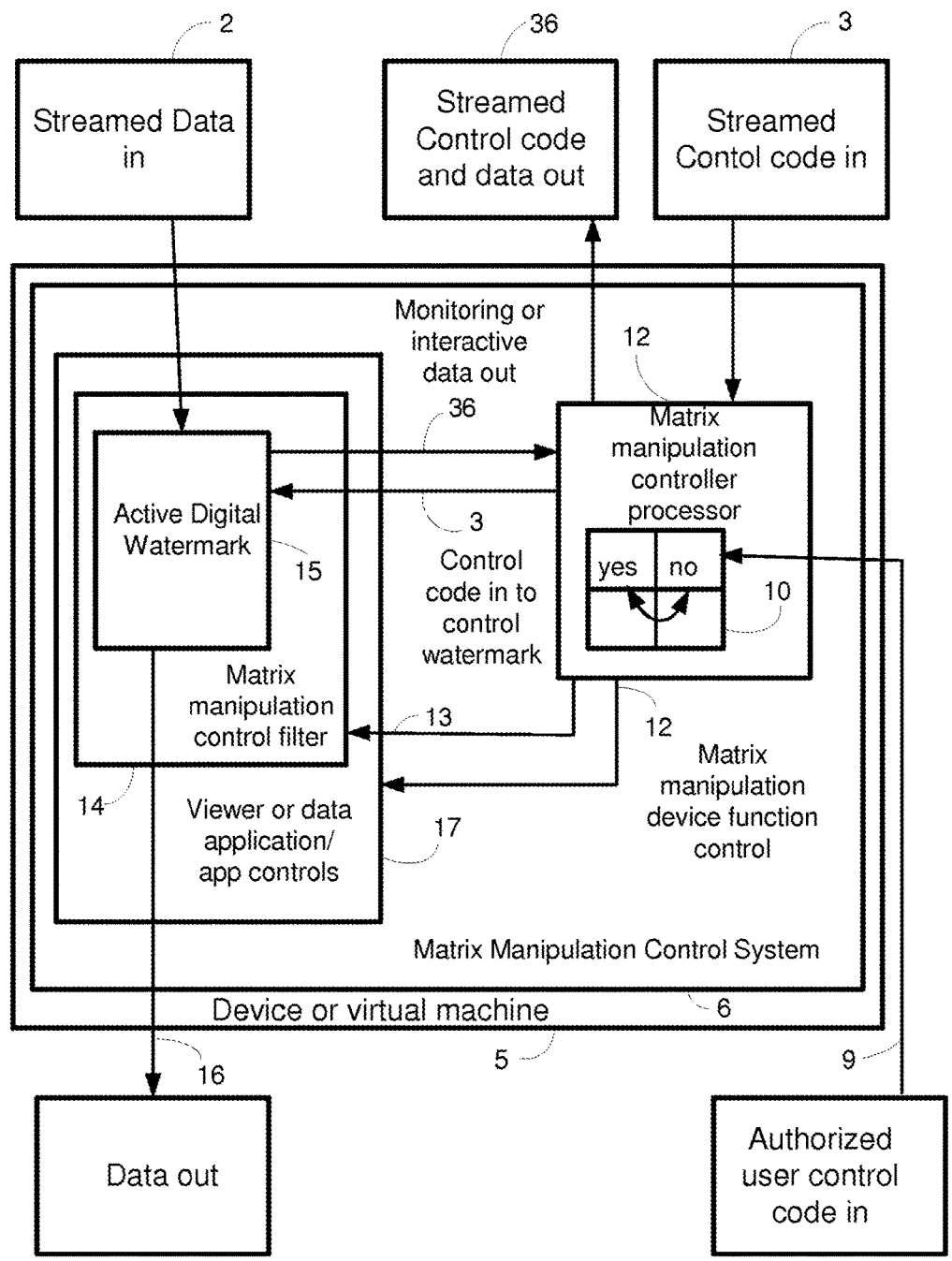

FIG. 2 represents the inner workings of the matrix manipulation control system and using the control codes from the user and the provider to actively control access and functionality of an active digital watermark embedded in the streamed data.

Figure 3:
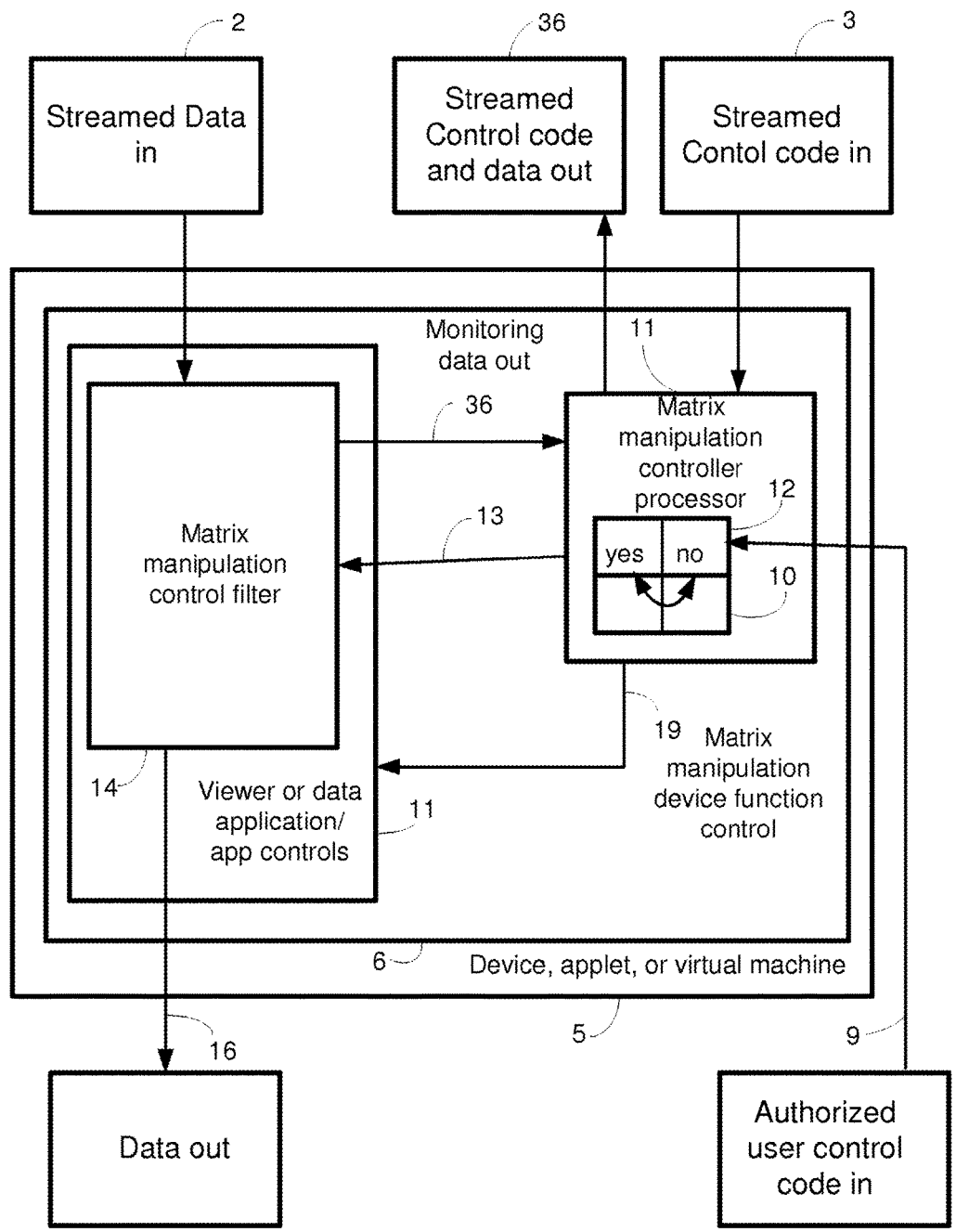
Figure 4:
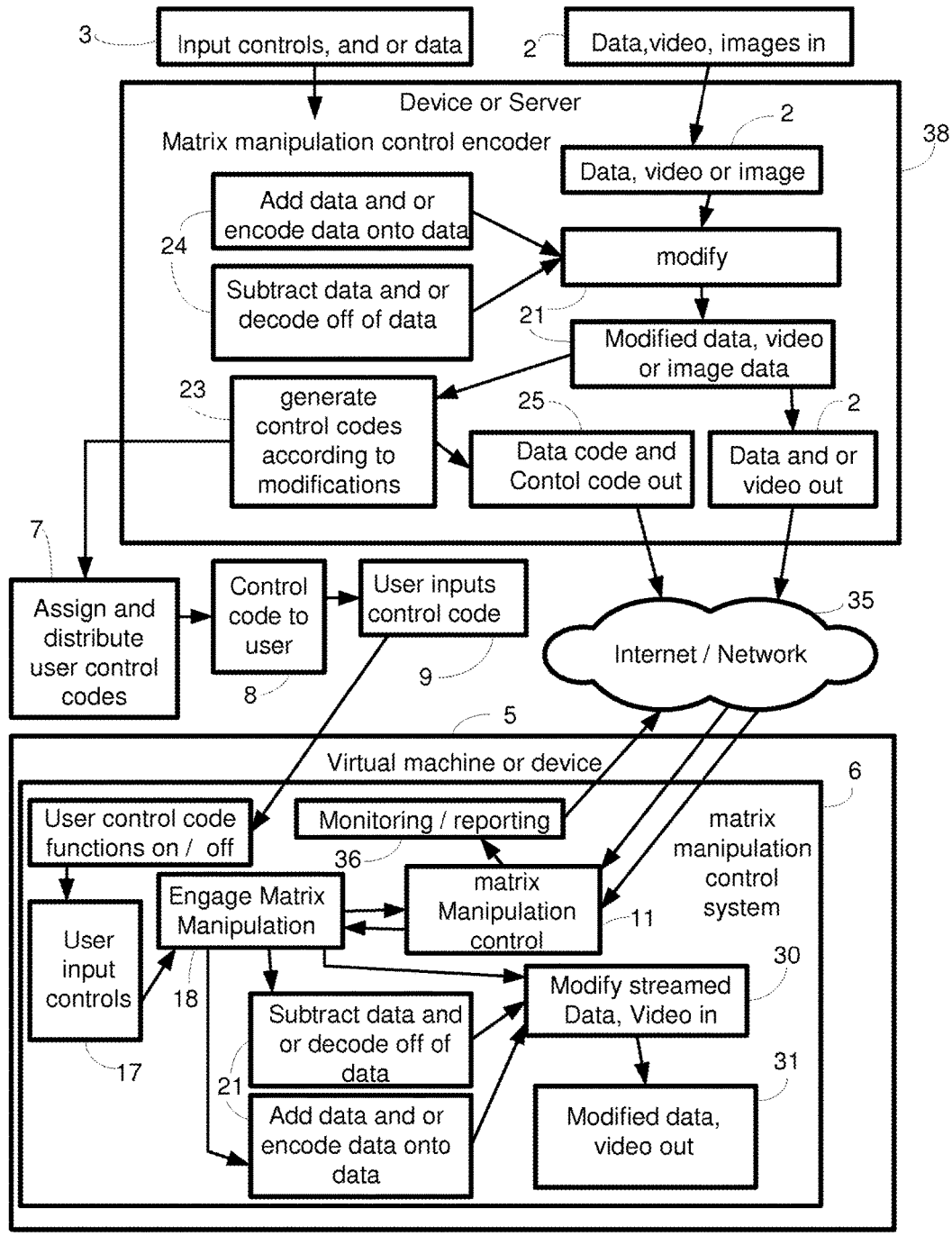

FIG. 3 represents the same inner workings of the matrix manipulation control system and using the control codes from the user and the provider to actively control access and functionality of streamed data without an embedded active digital watermark using only the functionality of the matrix manipulation control system on regular streamed content with no digital water mark embedded in the data FIG. 4 represents the control of streamed data in the matrix manipulation system.

Figure 5:
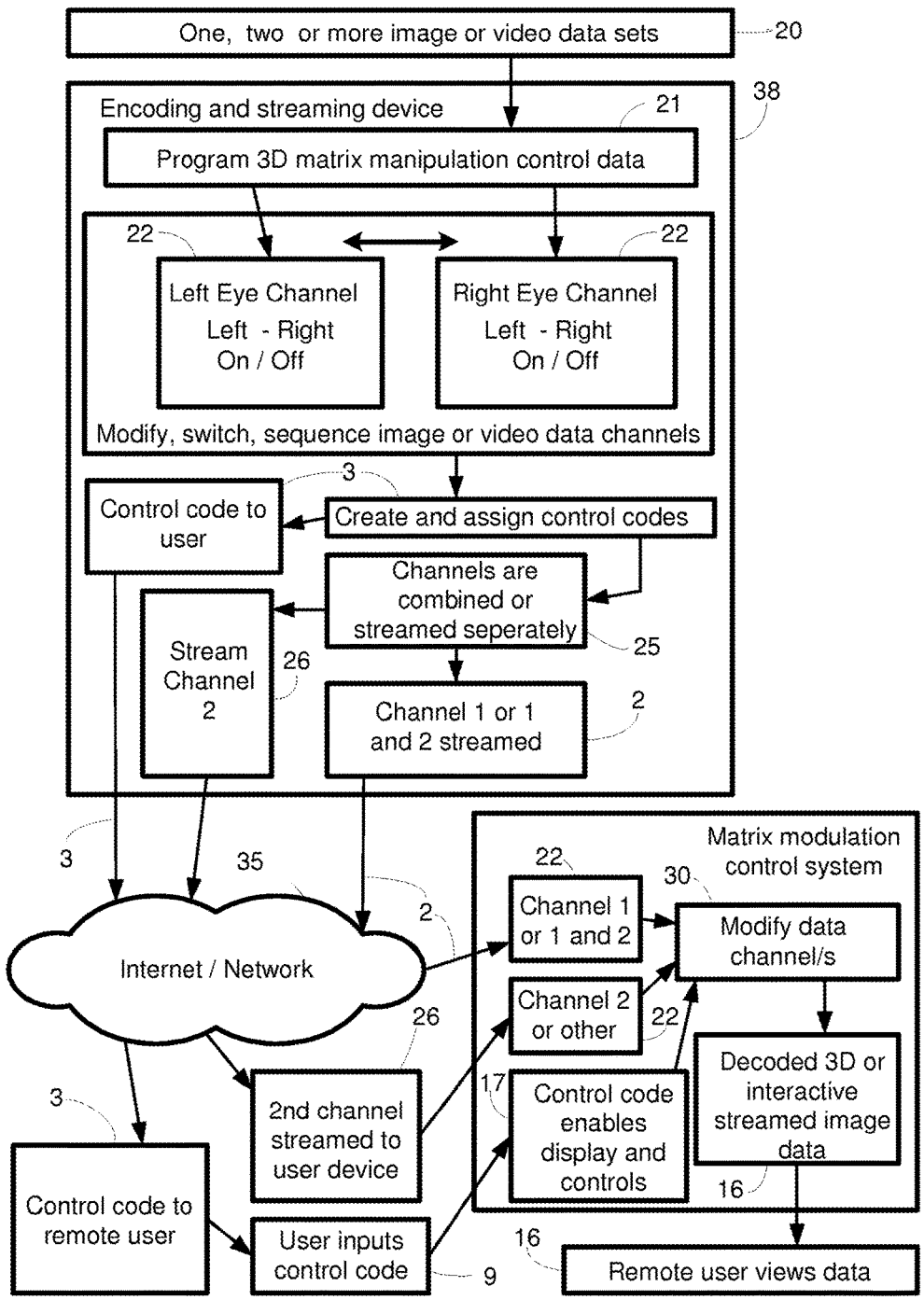

FIG. 5 represents the control of streamed data in the matrix manipulation system with embedded layers or a watermark in the streamed data.

Figure 6:
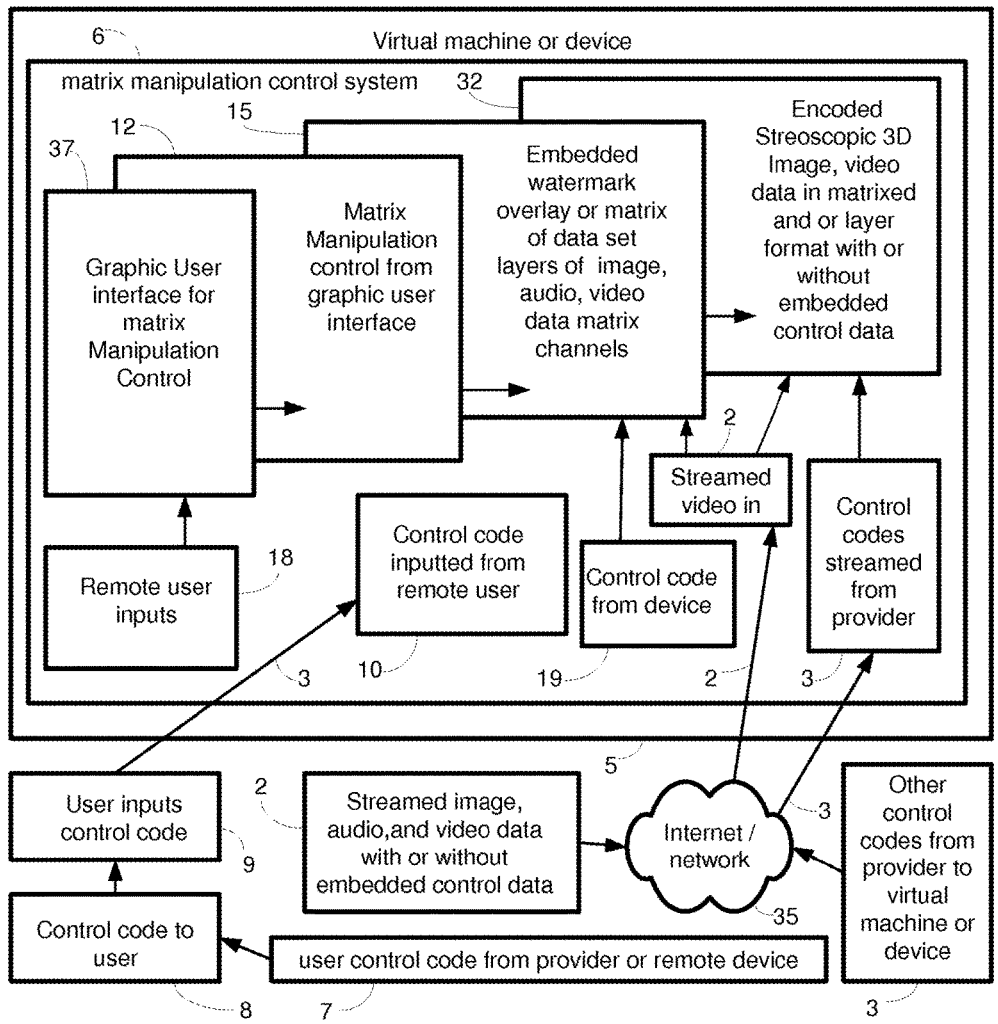

FIG. 6 represents how different sources of control codes can be used to control different functions on the streamed data and an embedded watermark or data layers and data sets embedded in the streamed image or video data with the matrix manipulation control system.

Figure 7:
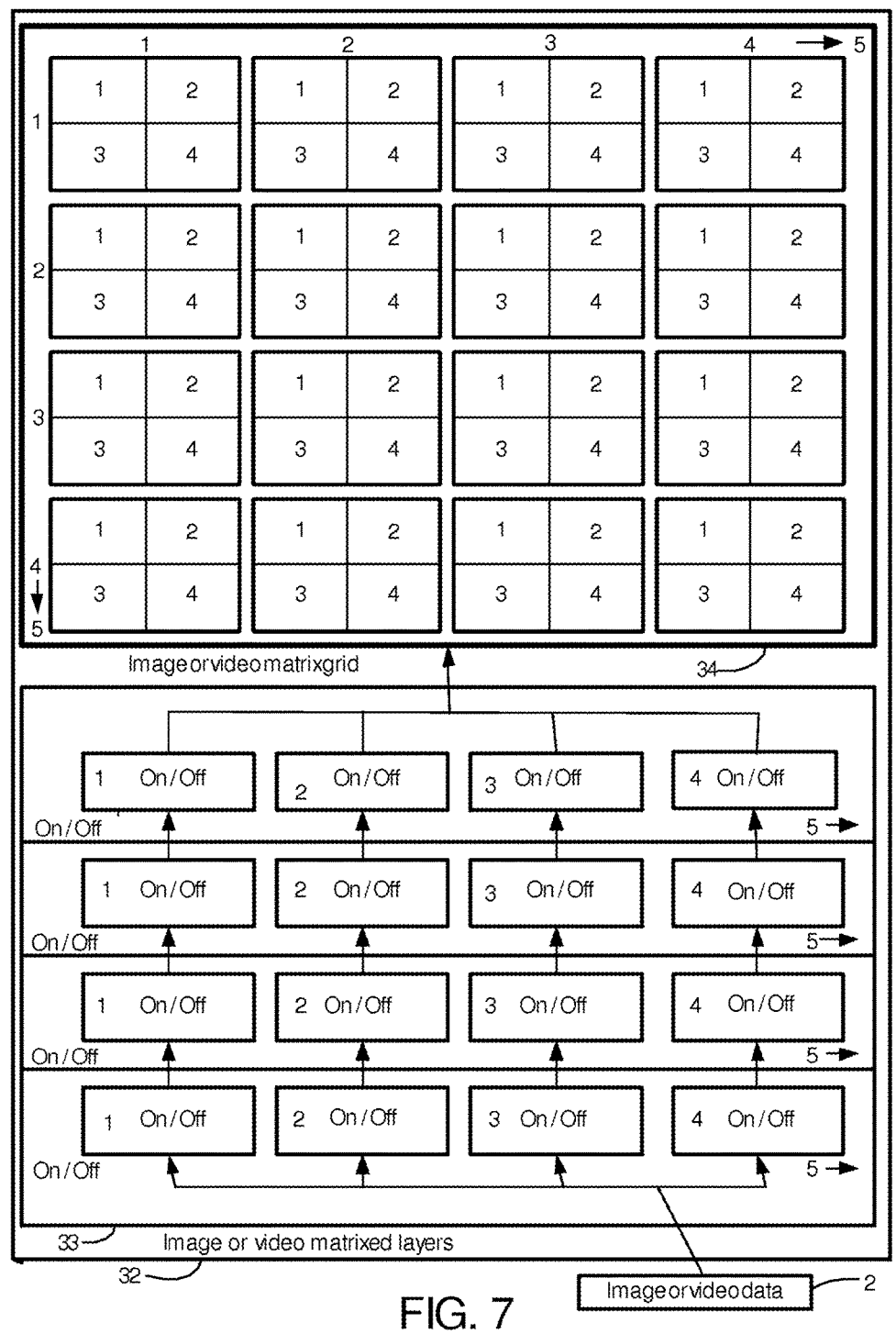

FIG. 7 represents an example of matrixed image data sets showing a sideways view of data set layers and an example of one embodiment of a display matrix facing the display looking at an example of four lines of resolution or one line with matrixed sub sets of matrixed image data sets.

DETAILED DESCRIPTION

The inventive subject matter provides apparatus, systems and methods in which an interactive streaming media and application service provider system can securely stream high resolution, multiple formats of video and data.

In preferred embodiments, different data sets can be included in a single stream. A rights management system can advantageously control matrix manipulation and other aspects of user control of the data, including one or more of rendering in various different 2D, 3D, or other media formats, reconstruction and modeling, zooming, frame grab, print frame, parental controls, picture in picture, preventing unauthorized copying, adapting to different data transmission formats, adapting to different resolutions and screen sizes, and actively control functionality contained in embedded data, encryption/decryption. In especially preferred embodiments, control can be exerted by an external entity through a user-side virtual machine. Control codes can optionally be embedded in the media, embedded in the user's device, and/or sent separately to the device.

Various objects, features, aspects and advantages of the inventive subject matter will become more apparent from the following detailed description of preferred embodiments, along with the accompanying drawing figures in which like numerals represent like components.

Throughout the following discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The matrix manipulation control system uses the Boolean control code streamed from the provider's remote device to activate a set of matrix manipulation controls inside the virtual machine which change s or transforms the images and data being displayed by calculating matrix transformation on each of the pixels to be display or audibly presented in order to manipulate the data.

One of the preferred embodiments of this invention configures a matrix manipulation function to act as a digital filter which is a variable matrix of digital doors for streamed data which is always active or can be "off" or "in use" so that the data to be controlled, utilized, displayed or rendered or played back in the manner in which the data was intended to be played back and is always being processed through the matrix manipulation system process. If the manipulation process were to stop the data would be corrupted or non-usable or limited in the amount of data or portions of the data that are allowed to pass through the matrix manipulation filter.

The matrix manipulation filter searches for Boolean Patterns or pattern from other codes used that are coming in the control code both from the application service provider and the authorized remote user to activate or deactivate the Matrix manipulation filtering or control functions of the data streamed to the device or virtual machine operating in a remote computer or other networked computer device. The code is a form of puzzle that requires corresponding sections of the puzzle to be filled in by the corresponding pieces contained in the authorized remote users control code.

The user control code is streamed to the control link in the matrix manipulation control device which is active and can be changed simultaneously between the corresponding control code from the provider and the code from the authorized user by sending the user control code to a cell phone or other device which would send the users control code to the device with a Wi-Fi or any other wireless standard connection between the devices.

The user code provided to the user can be activated and changed remotely so that the key or authorization code is never the same also new functionality can be added to the user's service provided under the control of the application or media service provider. One embodiment of this inventive method would be to stream the control code to the remote user's cell phone or other radio device, or wireless internet transmitter to allow the user to communicate with other devices that have the service providers control code to match and allow the user to use matrix manipulation controlled function on any other system that is networked into the service providers using my novel method and system.

Matrix manipulation control filtering in one embodiment can be applied to recognize image patterns in a digital image pattern or sequence of data by running a control code activated process in the matrix manipulation control that monitors the data stream and uses artificial intelligence to perform analytics on the date and activate other processes to send the data produce by using the matrix manipulation control system to monitor the data stream.

In one embodiment of the inventive subject matter the system described could also be used to actively tell the matrix control system to filter out data based on my method for instructing the matrix manipulation control to function as an active filter.

In one embodiment of the inventive subject matter the system would monitor the stream for certain determined patterns of colors and shapes and other means of artificial intelligence image recognition using this method.

In one embodiment of this invention data can also be changed by actively removing portions of an image to be displayed in real time by using artificial intelligence to obscure faces or address and phone numbers on signs as needed by the provider of the streamed data.

One embodiment of this invention is an invisible Digital Watermark" encoded onto the data itself such as a video or image or data which is actively removed or controlled by the matrix manipulation control system described herein. 3D data can be displayed using this method with a series of image layers with a small space between them encoded into a single stream to be decoded in the remote device and then sequenced or switched on an off using matrix manipulation.

The Matrix manipulation system can act as a filter independent of the code itself and it can be used to activate the embedded digital watermark function embedded in the streamed data or streamed with the data as a separate code. This same inventive method can also in one embodiment to control the functionality of 3D video and image streaming on demand or activating higher resolution on any device for any one stream rather than for all images displayed for the device.

One embodiment of this invention is using a pass key that is streamed to the matrix manipulation control device and will not open until the corresponding section of the digital pass key is combined with the digital passkey of the authorization control code entered by the authorized remote user to form the completed pass key or completed digital puzzle. The matrix manipulation control system would scramble the image or some other function if both parts of the digital pass key were not authorized to function together. The pass key functions can be an actively modulated and digitally controlled remotely on both ends of the control code inputs, from the service provider through the streamed control code coming in with the selected streamed data, and from the code that is streamed to the user to input from the user's end while continuously actively changing to continually fit together as the encryption or function controlling control code is streamed to the users remote device.

The matrix manipulation control is engaged actively at all time while the remote viewer or other device is functioning inside the remote users computer or web device like an electric screen door that has to be turned off for all the data to pass through or the authorized portion of the data to pass through the electric matrix of doors of the matrix manipulation control system. The input of the authorized remote users control code to the system will turn off the electric matrix of doors or just turn off the portions Control codes from the provider is streamed to the remote user or contained in the remote user's device to allow access to 3D video content or access to higher resolution. The same system can turn on and off colors in images or enlarge images, or enhance images, zoom in on selected portions of image data, cut and paste image data, and perform various rendering functions by performing a pixel by pixel transformation using the corresponding matrix manipulation algorithm for the desired effect.

Streamed 3D data is switched, sequenced, modified and/or transformed as layers of frames, side by side frames, or a checkerboard matrix of pixels for each frame by mathematically switching on and off as desired each data set and every part of each data set individually using matrix manipulation inside a matrix manipulation control system operating in a virtual machine or other device to achieve any type of 3D display needed at any resolution desired by the remote user or required for the remote user's device in order to be properly displayed or monitored.

The matrix manipulation control system can be switched to allow for different audio tracks to be played which could allow for multiple languages to be streamed simultaneously and the user can select which language the matrix manipulation control system will let through the matrix manipulation doors.

In normal streamed data virtual machine viewers or devices, matrix manipulation is applied interactively by the remote user. Our inventive method goes much further by applying matrix manipulation full time to the streamed encoded data decoding process that occurs inside the virtual machine to act as a digital gate for data to get to the viewer or device data output system. This digital gate function can also transform the data into other outputted data.

The Matrix manipulation function is always activated just to keep the image stable or viewable or to allow manual manipulation of the data by an authorized remote user. If the matrix manipulation turns of the image goes to a default mode that renders the system useless or only capable of delivering a predetermined set of functions such as only low resolution video or no 3D function as an example of the many embodiments possible for this invention.

Media providers or other business like appliance manufacturers could control user access and functionality of any device including remote viewer systems and other devices not related to images or data such as remote switching functions and remote data monitoring by capturing bits of data from the matrix manipulation system to gather data remotely in an upstream function from the remote device triggered by the matrix manipulation system through the Boolean control code sent from the provider. This can be done on any Internet ready devices or networked devices and smart appliances using my novel method.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

I claim:

1. A device selected from a group consisting of
   a computer,
   a tablet, and
   a smart phone;
the device including
   a display,
   a network interface,
   a persistent computer memory,
   an operating system stored on the persistent memory,
   a browser operating dependently on the operating system,
   a virtual machine in the browser operating independently of the operating system;
the network interface configured to receive
   a first streamed data set and
   a first Boolean control code
   from a network server;
the virtual machine including a matrix manipulation function at least partially under control of the network server, the matrix manipulation function using the first Boolean control code to process the first streamed data set, within the virtual machine, into data, video, or image media; and the display configured to present the data, video, or image media processed by the matrix manipulation function of the virtual machine.

2. The device of claim 1 further comprising
a user input component configured to receive a user control code;
the first Boolean control code readable by the virtual machine and indicating the user control code is required to access the data, video, or image media in the first streamed data set;
the matrix manipulation function configured to use both
the first Boolean control code indicating the user control code is required and
the user control code
to process the first streamed data set, within the virtual machine, into the data, video, or image media.

3. The device of claim 2 further comprising
the network interface configured to receive
a second streamed data set and
a second Boolean control code
the second Boolean control code readable by the virtual machine and indicating the user control code is not required to access the data, video, or image media in the second streamed data set; and
the matrix manipulation function, independently of the user control code, using
the second Boolean control code
to process the second streamed data set, within the virtual machine, into data, video, or image media.

4. The device of claim 2 wherein
the matrix manipulation function includes an authentication process between the user control code and the first Boolean control code to enable access to the data, video, or image media in the first streamed data set.

5. The device of claim 2 further comprising
a transient computer memory,
wherein
the matrix manipulation function within the virtual machine processes the first streamed data set from the transient computer memory, and
the matrix manipulation function within the virtual machine buffers the data, video, or image media in the first streamed data into the transient computer memory.

6. The device of claim 5 wherein
the transient computer memory includes computer readable instructions for the virtual machine, and
the persistent computer memory includes computer readable instructions for the browser.

7. The device of claim 1 wherein
the network interface includes a wireless data transmitter.

8. The device of claim 1 wherein
the display is configured to present a portion of the data, video, or image media processed by the matrix manipulation function of the virtual machine before the network interface receives all of the first streamed data set.

9. The device of claim 1 wherein
the matrix manipulation function is configured to selectively process the first streamed data set into one of a plurality of different resolutions of data, video, or image media.

10. The device of claim 9 further comprising
a user input component configured to receive a user control code;
the first Boolean control code readable by the virtual machine and indicating the user control code is required to process a first resolution of the data, video, or image media in the first streamed data set;
the matrix manipulation function configured to process a second resolution of the data, video, or image media in the first streamed data set without the user control code.

11. The device of claim 1 wherein
the matrix manipulation function includes a manipulation selected from a group consisting of a zoom manipulation and a picture-in-picture manipulation.

12. A system for providing data, video, or image media while preventing unauthorized viewing or copying of the data, video, or image media, the system comprising:
a network database storing the data, video, or image media;
a network server system configured to encrypt the data, video, or image media into a first data set, a first interface of the network server system further configured to stream a network control code and a second interface of the network server system further configured to stream the first data set to a user device; and
the user device including
instructions for an operating system and a browser stored on a non-transitory portion of a computer readable medium,
instructions for a matrix manipulation function within a virtual machine stored on a buffer of the computer readable medium, wherein the matrix manipulation function
is at least partially under control of the network server system and
is configured to use the network control code to process the streamed first data set, within the virtual machine, into the data, video, or image media,
a processor executing the instructions for the matrix manipulation function within the virtual machine within the browser and independently of the operating system to process the streamed first data set, and
a display configured to present the data, video, or image media processed by the processor.

13. The system of claim 12 wherein
the non-transitory portion of the computer readable medium further includes a user control code, and
the matrix manipulation function is configured to use both the network control code and the user control code to process the streamed first data set into the data, video, or image media.

14. The system of claim 12 wherein
the buffer of the computer readable medium further includes a user control code, and
the matrix manipulation function is configured to use both the network control code and the user control code to process the streamed first data set into the data, video, or image media.

15. The system of 12 wherein
the buffer of the computer readable medium further includes a user control code;
the network control code includes an indicator with a first state or a second state;
the matrix manipulation function is configured to use the user control code and the network control code with the indicator in the first state to process the streamed first data set into the data, video, or image media; and
the matrix manipulation function is configured to use the network control code with the indicator in the second state to process the streamed first data set into the data, video, or image media without the use of the user control code.

16. The system of 12 wherein the user device includes a network interface with a wireless data transmitter for receiving the network control code and the first data set from the network server system; and the user device is configured to present a portion of the data, video, or image media processed by the processor on the display before all of the streamed first data set is received from the network server system via the network interface.

17. The system of claim 12 wherein the processor reads the streamed first data set from the buffer of the computer readable medium and writes the data, video, or image media to the buffer of the computer readable medium.

18. The system of claim 12 wherein the instructions for the matrix manipulation function include instructions for removing an active digital watermark from the streamed first data set.

* * * * *